US011238363B2

(12) United States Patent
Sinha et al.

(10) Patent No.: US 11,238,363 B2
(45) Date of Patent: Feb. 1, 2022

(54) ENTITY CLASSIFICATION BASED ON MACHINE LEARNING TECHNIQUES

(71) Applicant: Accenture Global Solutions Limited, Dublin (IE)

(72) Inventors: Rajeev Sinha, Bangalore (IN); Meenakshi Arvind Lingayat, Thane West (IN)

(73) Assignee: Accenture Global Solutions Limited, Dublin (IE)

( * ) Notice: Subject to any disclaimer, the term of this patent is extended or adjusted under 35 U.S.C. 154(b) by 1192 days.

(21) Appl. No.: 15/499,372

(22) Filed: Apr. 27, 2017

(65) Prior Publication Data
US 2018/0314973 A1 Nov. 1, 2018

(51) Int. Cl.
*G06N 3/08* (2006.01)
*G06N 7/00* (2006.01)
*G06N 20/00* (2019.01)

(52) U.S. Cl.
CPC ............. *G06N 20/00* (2019.01); *G06N 7/005* (2013.01); *G06N 3/08* (2013.01)

(58) Field of Classification Search
CPC .......... G06N 20/00; G06N 7/005; G06N 3/08
See application file for complete search history.

(56) References Cited

U.S. PATENT DOCUMENTS

| 2013/0325660 | A1* | 12/2013 | Callaway | ........... | G06Q 30/0609 705/26.35 |
| 2014/0172754 | A1* | 6/2014 | He | .......................... | G06N 5/02 706/12 |
| 2016/0232160 | A1* | 8/2016 | Buhrmann | .............. | G06F 40/14 |
| 2016/0378437 | A1* | 12/2016 | Patino-Bueno | ....... | G06F 3/0482 717/105 |
| 2017/0161366 | A1 | 6/2017 | Maitra et al. | | |
| 2018/0018315 | A1* | 1/2018 | Takei | .................... | G06F 40/109 |
| 2018/0032606 | A1* | 2/2018 | Tolman | ................... | G06F 16/35 |

OTHER PUBLICATIONS

Co-pending U.S. Appl. No. 15/046,032, by Anutosh Maitra et al., entitled "Scoring Documents", filed Feb. 17, 2016, 66 pages.

\* cited by examiner

*Primary Examiner* — Hal Schnee
(74) *Attorney, Agent, or Firm* — Harrity & Harrity, LLP

(57) ABSTRACT

A device may receive information that identifies a requirement. The device may receive information associated with a set of positive entities and a set of negative entities. The device may identify a set of priority terms based on the information associated with the set of positive entities and the set of negative entities. The device may identify a first set of ancillary terms and a second set of ancillary terms based on the information that identifies the set of priority terms. The device may generate a model based on the set of priority terms, the first set of ancillary terms, and the second set of ancillary terms. The device may determine a set of classification scores, for a set of unclassified entities, based on information associated with the set of unclassified entities and the model. The device may provide information that identifies the set of classification scores to cause an action to be performed in association with the set of unclassified entities.

20 Claims, 10 Drawing Sheets

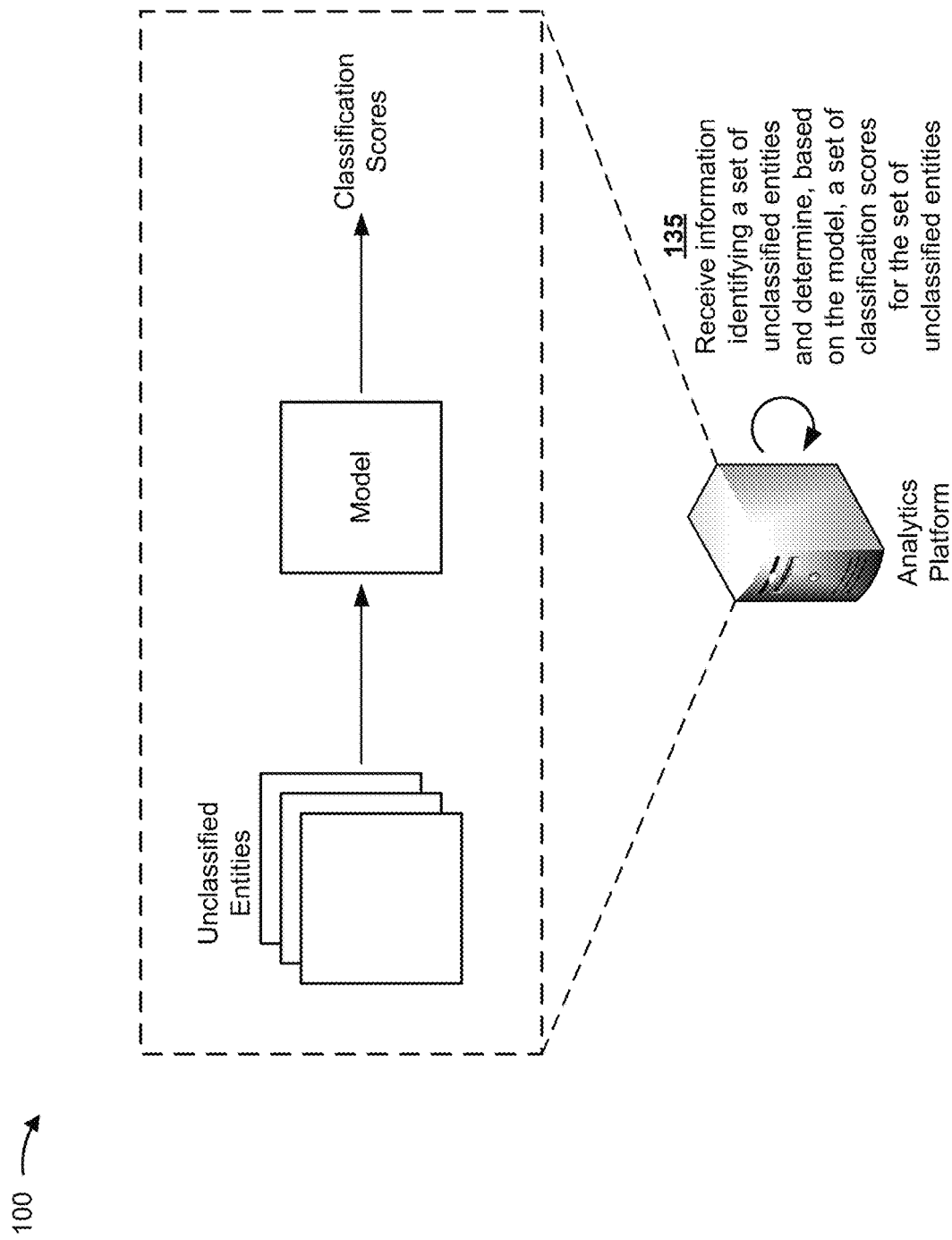

ENTITY CLASSIFICATION BASED ON MACHINE LEARNING TECHNIQUES

BACKGROUND

An entity (e.g., an individual, an organization, a company, etc.) may satisfy a requirement or not satisfy a requirement based on particular characteristics associated with the entity. Machine learning techniques may be used in association with entity data to classify other entities.

SUMMARY

In some possible implementations, a device may include one or more processors to receive information that identifies a requirement. The one or more processors may receive information associated with a set of positive entities and a set of negative entities. The set of positive entities and the set of negative entities may be associated with other requirements that are associated with the requirement. The one or more processors may identify a set of priority terms based on the information associated with the set of positive entities and the set of negative entities. The one or more processors may identify a first set of ancillary terms and a second set of ancillary terms based on the information that identifies the set of priority terms. The first set of ancillary terms being associated with the information that is associated with the set of positive entities. The second set of ancillary terms being associated with the information that is associated with the set of negative entities. The one or more processors may generate a model based on the set of priority terms, the first set of ancillary terms, and the second set of ancillary terms. The one or more processors may determine a set of classification scores, for a set of unclassified entities, based on information associated with the set of unclassified entities and the model. The one or more processors may provide information that identifies the set of classification scores to cause an action to be performed in association with the set of unclassified entities.

In some possible implementations, a method may include receiving, by a device, information associated with a set of positive entities and a set of negative entities. The set of positive entities and the set of negative entities may be associated with a set of requirements. The method may include identifying, by the device, a set of priority terms based on the information associated with the set of positive entities and the set of negative entities. The method may include identifying, by the device, a first set of ancillary terms and a second set of ancillary terms based on the information that identifies the set of priority terms. The first set of ancillary terms being associated with the information that is associated with the set of positive entities. The second set of ancillary terms being associated with the information that is associated with the set of negative entities. The method may include generating, by the device, a model based on the set of priority terms, the first set of ancillary terms, and the second set of ancillary terms. The method may include determining, by the device, a set of classification scores, for a set of unclassified entities, based on information associated with the set of unclassified entities and the model. The method may include providing, by the device, information that identifies the set of classification scores to cause an action to be performed in association with the set of unclassified entities.

In some possible implementations, a non-transitory computer-readable medium may store one or more instructions that, when executed by one or more processors, cause the one or more processors to receive information that identifies a requirement. The one or more instructions may cause the one or more processors to receive information associated with a set of positive entities and a set of negative entities. The set of positive entities and the set of negative entities may be associated with other requirements that are associated with the requirement. The one or more instructions may cause the one or more processors to identify a set of priority terms based on the information associated with the set of positive entities and the set of negative entities. The one or more instructions may cause the one or more processors to identify a first set of ancillary terms and a second set of ancillary terms based on the information that identifies the set of priority terms. The first set of ancillary terms may be associated with the information that is associated with the set of positive entities. The second set of ancillary terms may be associated with the information that is associated with the set of negative entities. The one or more instructions may cause the one or more processors to generate a model based on the set of priority terms, the first set of ancillary terms, and the second set of ancillary terms. The one or more instructions may cause the one or more processors to determine a set of classification scores, for a set of unclassified entities, based on information associated with the set of unclassified entities and the model. The one or more instructions may cause the one or more processors to provide information that identifies the set of classification scores to permit an action to be performed in association with the set of unclassified entities.

BRIEF DESCRIPTION OF THE DRAWINGS

FIGS. 1A-1G are diagrams of an overview of an example implementation described herein;

DETAILED DESCRIPTION

The following detailed description of example implementations refers to the accompanying drawings. The same reference numbers in different drawings may identify the same or similar elements.

An organization may desire to select an entity. For example, a company may desire to hire an individual for an open position. In such cases, the organization may generate a requirement (e.g., a job description) that identifies a set of qualifications, credentials, etc. associated with a desired entity (e.g., applicant). In this case, and in association with an application process, a set of entities may submit respective entity information (e.g., resumes). An administrator associated with the organization may parse the submitted entity information to identify particular entities (e.g., to hire, to interview, etc.). In some cases, such a process may prove error prone, subjective, time consuming, and the like. Moreover, in situations where the organization receives thousands of resumes, an administrator may interact with a user device to process the submitted entity information, thereby consuming processor and/or memory resources of the user device.

Implementations described herein enable an analytics platform to receive information associated with a requirement (e.g., a job description) and identify a set of other requirements that are similar to the requirement (e.g., other job openings). Additionally, implementations described herein enable the analytics platform to receive information associated with the other requirements, such as information associated with a set of positive entities and a set of negative entities (e.g., candidates that were hired for the other job openings, and candidates that were not hired for the other job openings, respectively). Further still, implementations described herein enable the analytics platform to identify information associated with the set of positive entities and the set of negative entities (e.g., terms that appear in respective resumes), and generate models based on the information. Thereby, the analytics platform may score unclassified entities, using the generated models, in association with other requirements. In this way, implementations described herein improve accuracy of entity scoring and/or classification based on generating models using training data associated with entities having known classifications (e.g., positive or negative).

Figure 1A:
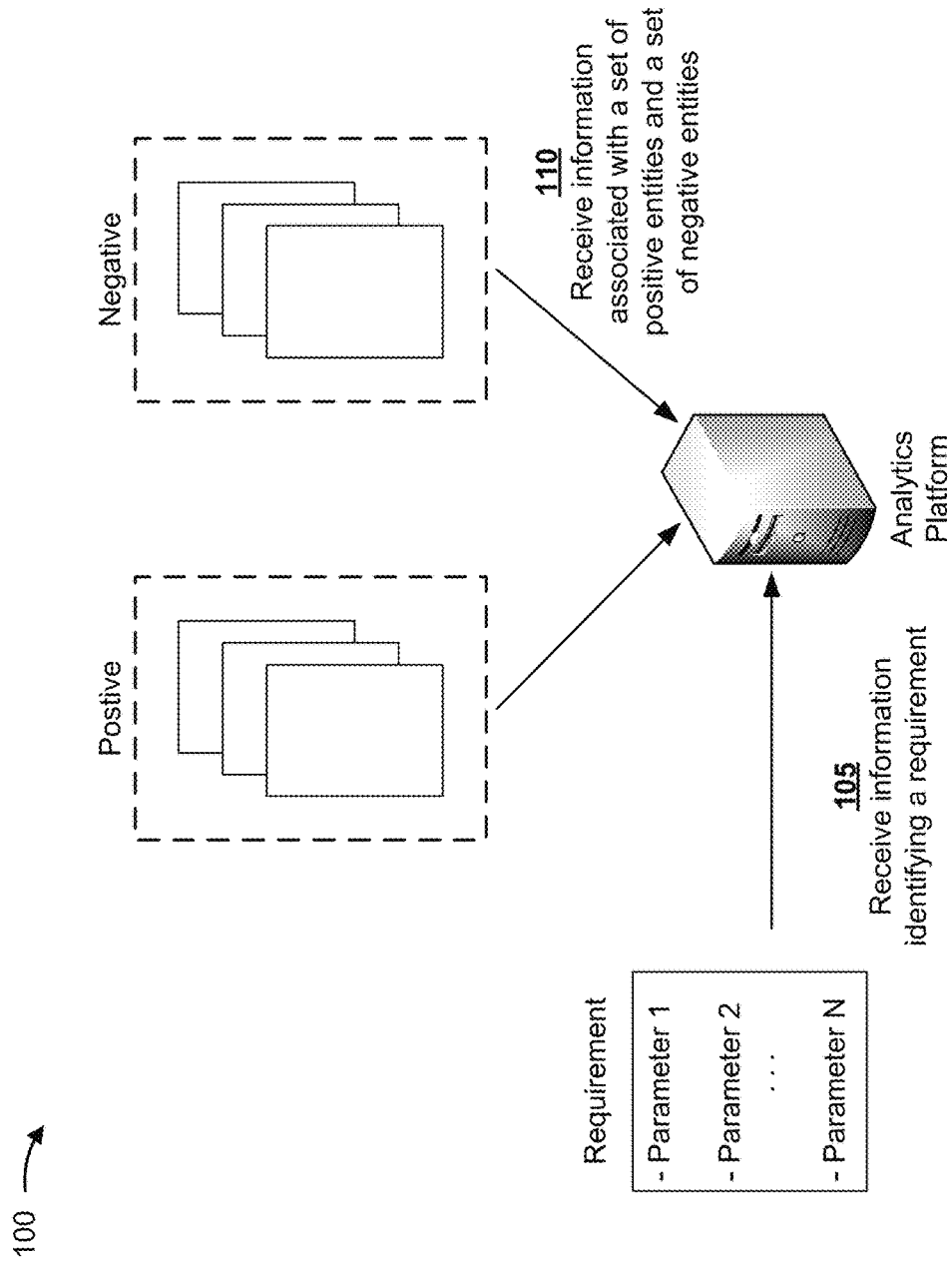

FIGS. 1A-1G are diagrams of an overview of an example implementation 100 described herein. As shown in FIG. 1A, and as shown by reference number 105, an analytics platform may receive information identifying a requirement. For example, the analytics platform may receive information associated with a job description. As shown by reference number 110, the analytics platform may receive information associated with a set of positive entities and a set of negative entities. For example, the analytics platform may receive information associated with resumes that were submitted for similar jobs. Additionally, the positive entities may correspond to individuals that were hired for a similar job, and the negative entities may correspond to individuals that were not hired for a similar job.

Figure 1B:
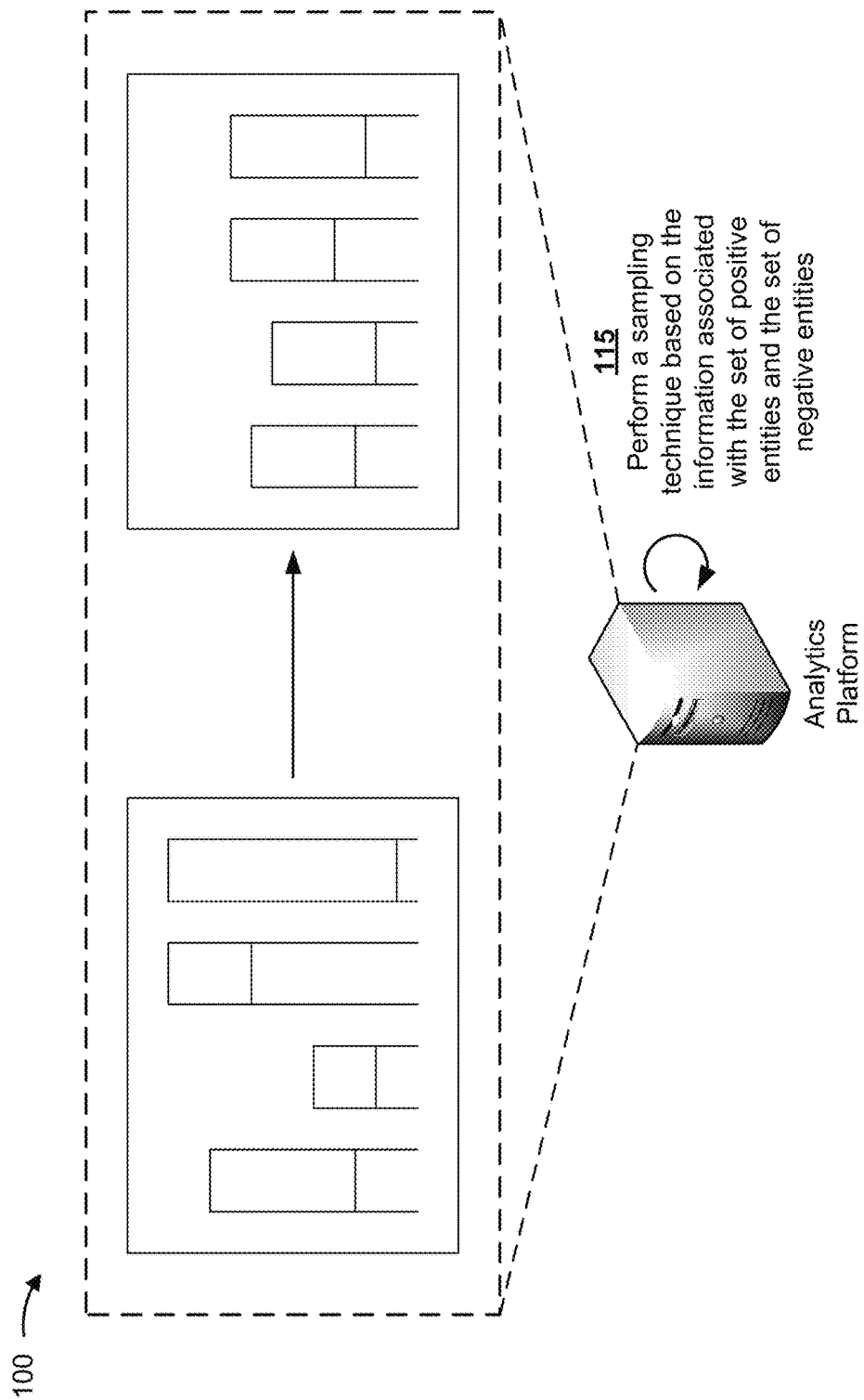

As shown in FIG. 1B, and as shown by reference number 115, the analytics platform may perform a sampling technique based on the information associated with the set of positive entities and the set of negative entities. As an example, the analytics platform may receive information associated with four other requirements (e.g., resumes that were submitted for four other job openings). Additionally, each of the four other requirements may be associated with a different number of submitted resumes, and/or may be associated with a different number of positive entities and negative entities. In this case, the analytics platform may perform the sampling technique such that each requirement, of the four other requirements, is associated with a more similar number of submitted resumes, and/or each of the four other requirements is associated with a more similar number of positive entities and negative entities than as compared to situations where the sampling technique is not performed. In this way, the analytics platform may reduce sampling bias associated with the set of requirements.

While FIG. 1B depicts information associated with four other requirements, in practice, the analytics platform may receive information associated with thousands, millions, etc. of other requirements and/or may receive information associated with thousands, millions, etc. of entities. In such cases, the analytics platform may implement one or more big data techniques to efficiently process the information.

Figure 1C:
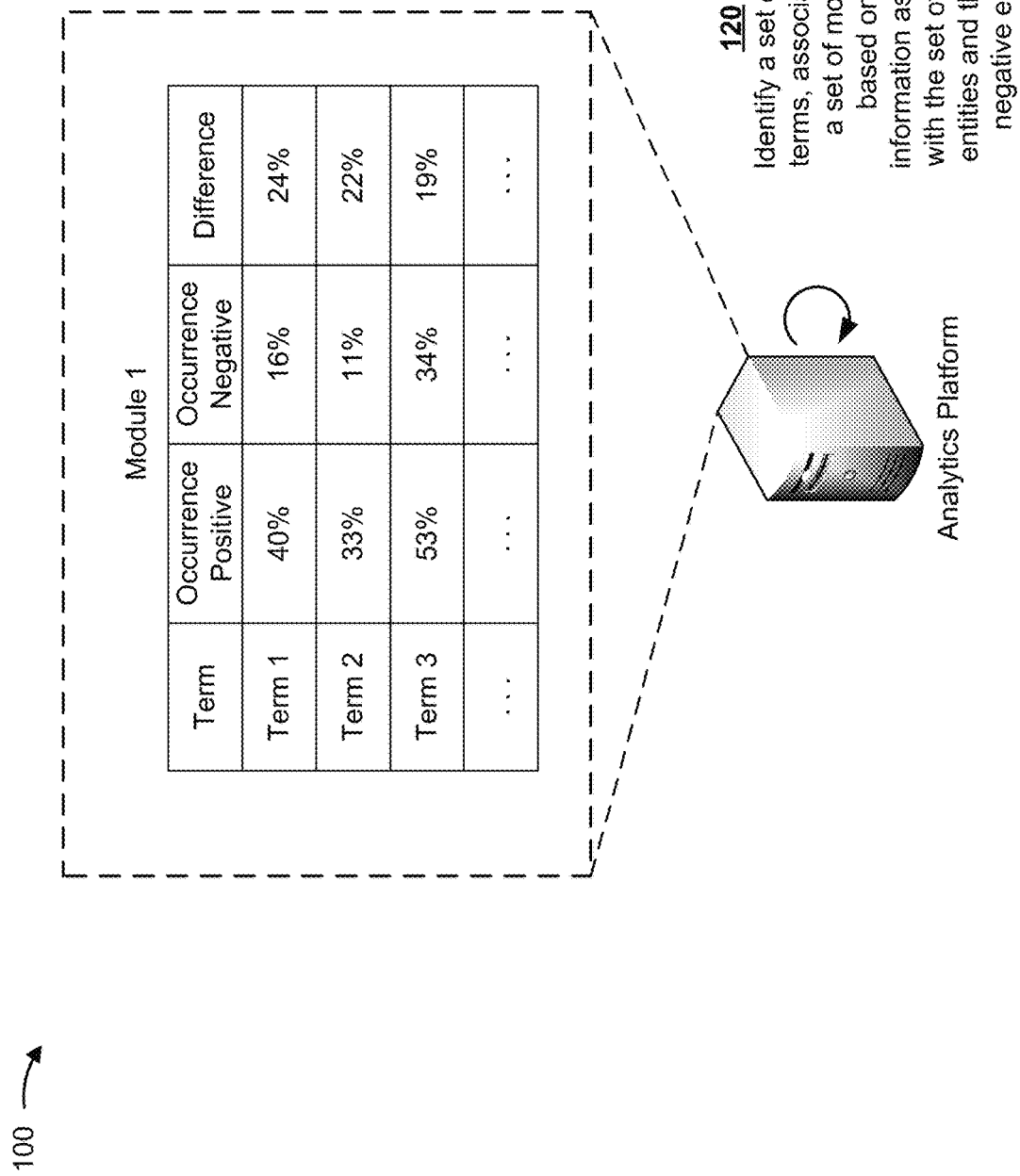

As shown in FIG. 1C, and as shown by reference number 120, the analytics platform may identify a set of priority terms, associated with a set of modules, based on the information associated with the set of positive entities and the set of negative entities. In some implementations, the information associated with an entity (e.g., a resume) may include a set of modules (e.g., an education module, a work experience module, a skill set module, etc.). Additionally, each module may be associated with various terms. A priority term, for example, may include a term that occurs in more data points (e.g., resumes) associated with positive entities than as compared to data points associated with negative entities.

As an example, and as shown in FIG. 1C, Term 1 occurs in forty percent of data points associated with positive entities, whereas Term 1 occurs in sixteen percent of data points associated with negative entities. In this case, Term 1 is associated with a difference value of twenty four percent (e.g., 40%−16%=24%). In some implementations, the analytics platform may identify priority terms based on respective difference values of the terms.

Figure 1D:
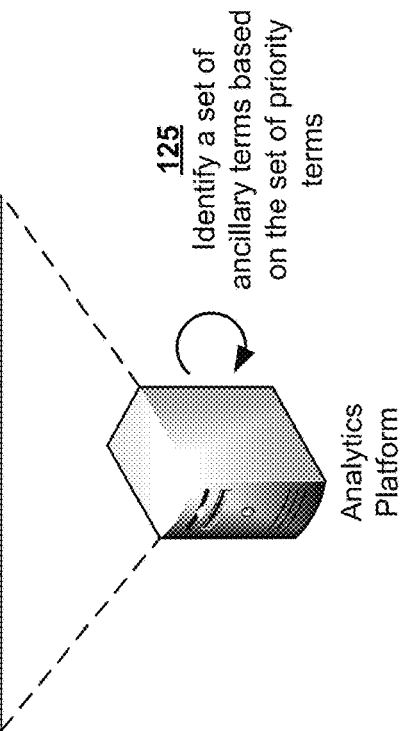

As shown in FIG. 1D, and as shown by reference number 125, the analytics platform may identify a set of ancillary terms based on the set of priority terms. For example, an ancillary term may refer to a term that occurs within a threshold distance of a priority term for a particular module (e.g., the preceding three terms, the subsequent four terms, or the like). In other words, respective data points (e.g., resumes) associated with positive entities and negative entities may include a priority term. However, the data points may include different terms that precede and/or follow the priority term (e.g., ancillary terms) for positive entities than for negative entities.

Figure 1E:
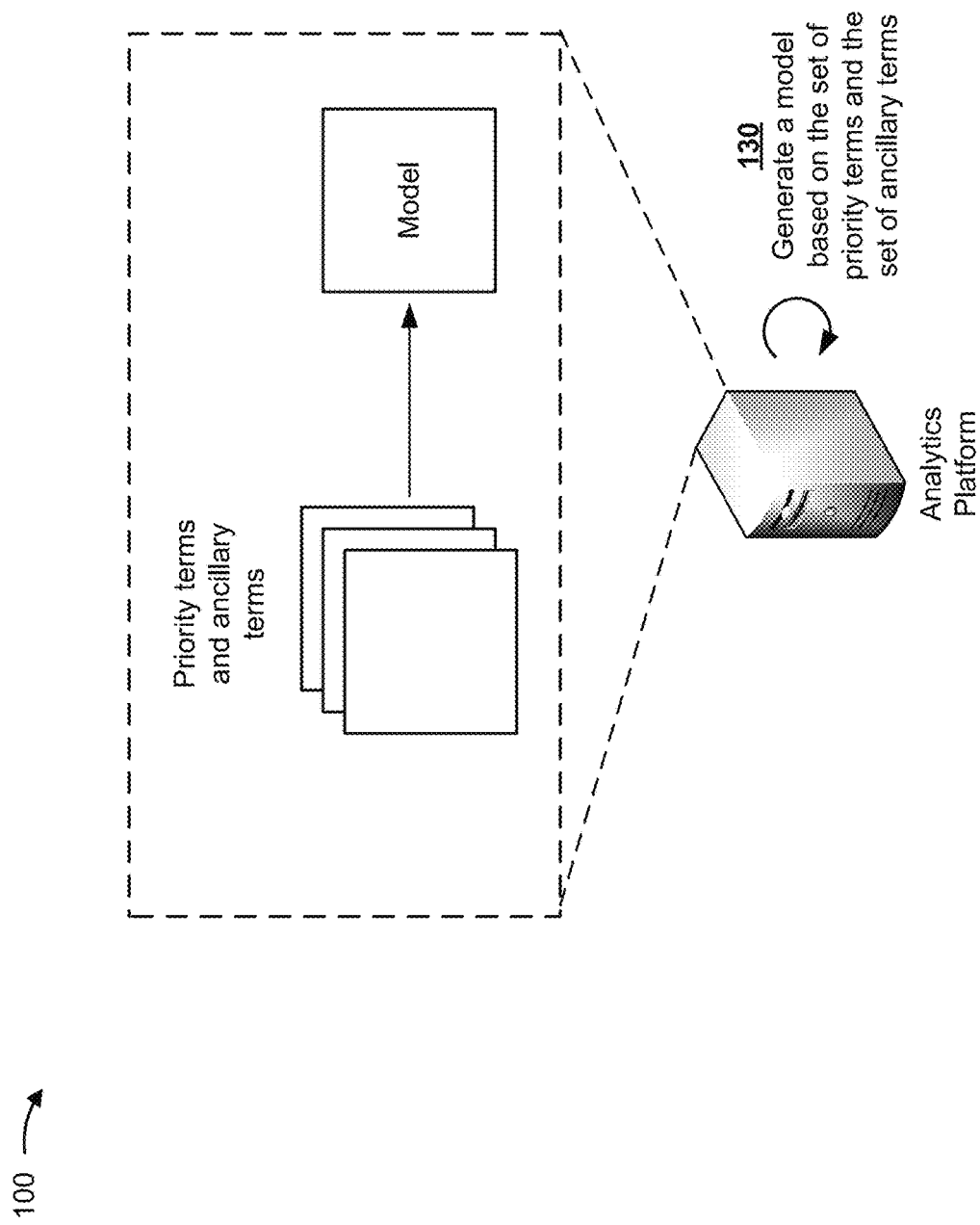

As shown in FIG. 1E, and as shown by reference number 130, the analytics platform may generate a model based on the set of priority terms and the set of ancillary terms. For example, the analytics platform may use machine learning techniques to analyze data (e.g., training data, such as historical data, data associated with positive entities, data associated with negative entities, etc.) or may use another kind of computer-implemented technique, such as artificial intelligence, machine perception, or computer vision, to generate the model. In this way, the analytics platform may correlate known classifications (e.g., positive and negative) and known terms (e.g., priority terms and ancillary terms). Additionally, the analytics platform may generate models based on correlating the known classifications and known terms, and may use the model to classify unclassified entities, as described elsewhere herein.

As shown in FIG. 1F, and as shown by reference number 135, the analytics platform may receive information identifying a set of unclassified entities and determine, based on the model, a set of classification scores for the set of unclassified entities. For example, the analytics platform may receive information (e.g., resumes) associated with a set of job applicants, and may determine a classification score for each job candidate. In this case, a higher classification score may indicate a greater likelihood of an applicant being hired, selected for an interview, or the like, for the particular job, than as compared to another entity that is associated with a lower classification score.

Figure 1G:
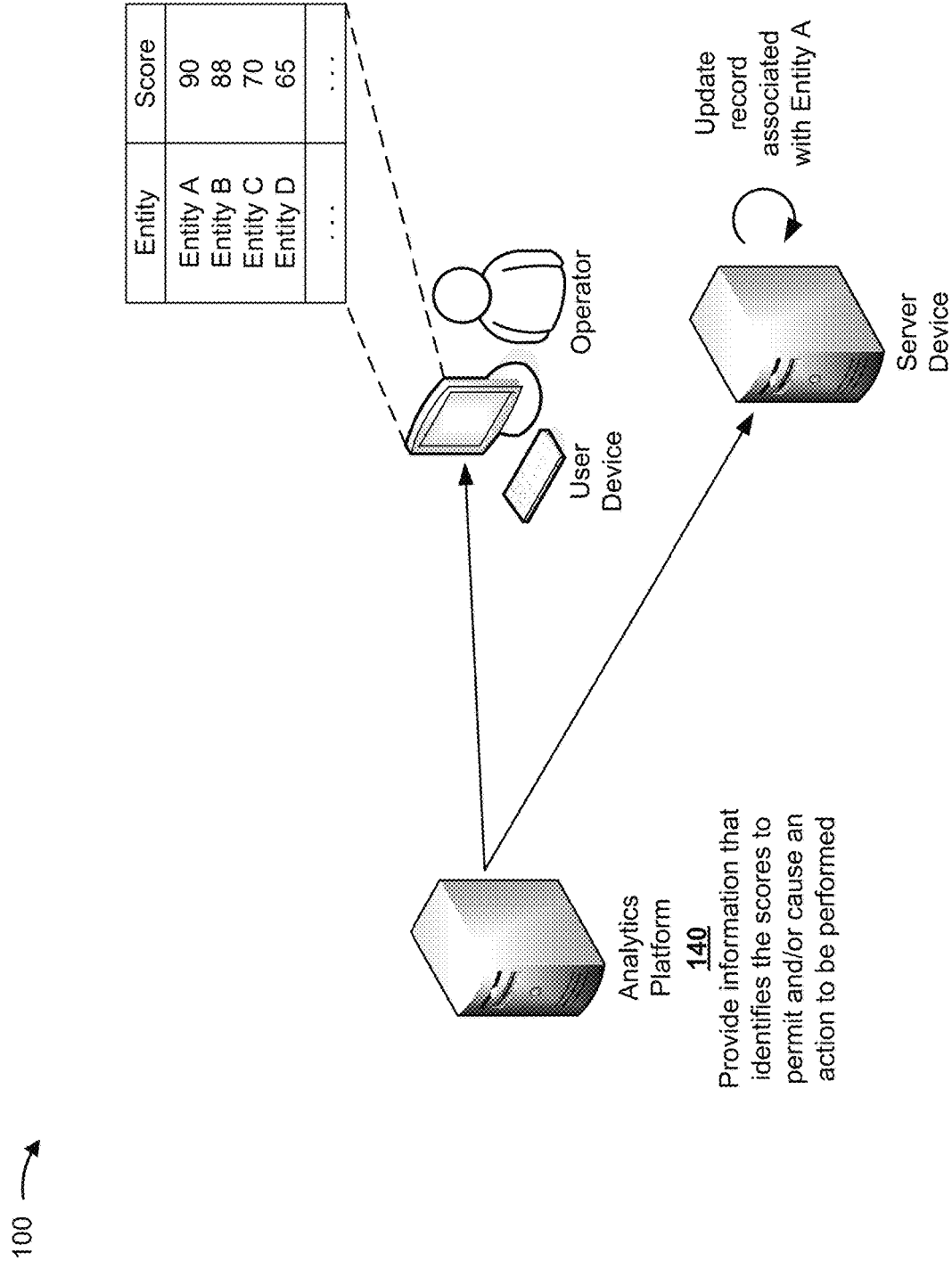

As shown in FIG. 1G, and as shown by reference number 140, the analytics platform may provide information that identifies the scores to permit and/or cause an action to be performed. For example, the action may include automatically scheduling an interview, approving a candidate, or the like. In some implementations, the action may be automatically performed when the classification score satisfies a threshold. As an example, and as shown in FIG. 1G, the analytics platform may provide, to a user device, information that identifies respective entities and classification scores. In this way, the user device may provide, for display, the information, thereby enabling an operator to identify particular entities. Additionally, as shown, the analytics platform may provide, to a server device, information that causes the server device to update a record associated with Entity A (e.g., the entity associated with the highest classification score) to identify that Entity A has been selected, should be interviewed, etc.

In this way, implementations described herein improve accuracy of entity scoring and/or classification based on generating models using training data associated with entities having known classifications (e.g., positive or negative) and identifying latent information associated with the entities having known classifications (e.g., based on priority terms and ancillary terms).

While implementations herein describe classifying particular entities based on particular requirements or types of requirements, it should be understood that other implementations include classifying other sets of entities based on other requirements. That is, the implementations described herein are applicable to classifying other types of entities based on other types of information. As an example, implementations described herein are applicable to a first company hiring, selecting, etc. a second company (e.g., a vendor, or the like) based on information associated with the second company and/or a set of other companies.

As indicated above, FIGS. 1A-1G are provided merely as an example. Other examples are possible and may differ from what was described with regard to FIGS. 1A-1G.

Figure 2:
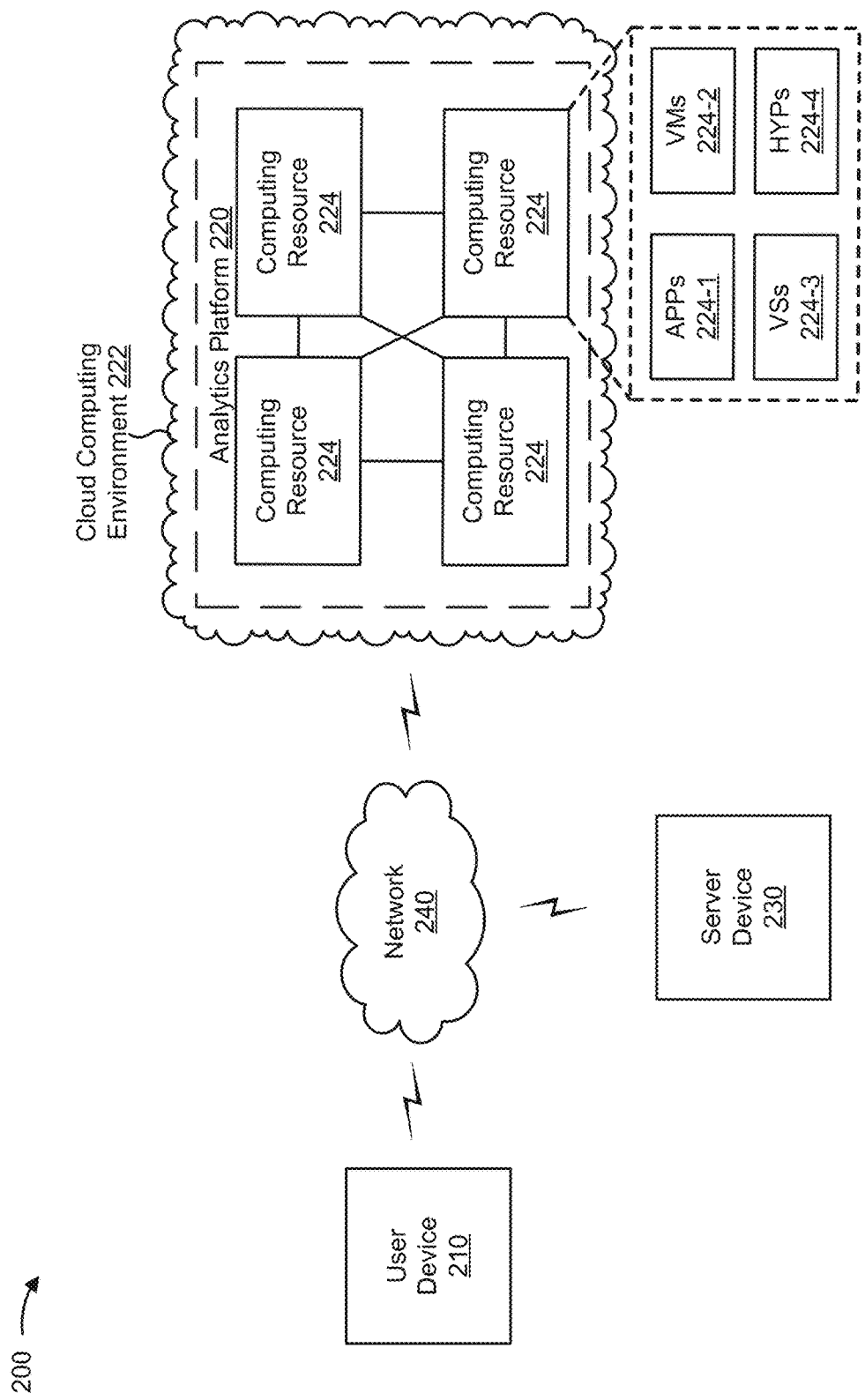
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, an analytics platform 220, a server device 230, and a network 240. Devices of environment 200 may interconnect via wired connections, wireless connections, or a combination of wired and wireless connections.

User device 210 includes one or more devices capable of receiving, generating, storing, processing, and/or providing information associated with analytics platform 220. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Analytics platform 220 includes one or more devices capable of determining classification scores for unclassified entities based on machine learning techniques. In some implementations, analytics platform 220 may be designed to be modular such that certain software components can be swapped in or out depending on a particular need. As such, analytics platform 220 may be easily and/or quickly reconfigured for different uses.

In some implementations, as shown, analytics platform 220 may be hosted in cloud computing environment 222. Notably, while implementations described herein describe analytics platform 220 as being hosted in cloud computing environment 222, in some implementations, analytics platform 220 may not be cloud-based (i.e., may be implemented outside of a cloud computing environment) or may be partially cloud-based.

Cloud computing environment 222 includes an environment that hosts analytics platform 220. Cloud computing environment 222 may provide computation, software, data access, storage, etc. services that do not require end-user (e.g., user device 210) knowledge of a physical location and configuration of system(s) and/or device(s) that hosts analytics platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host analytics platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210. Application 224-1 may eliminate a need to install and execute the software applications on user device 210. For example, application 224-1 may include software associated with analytics platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Server device 230 includes one or more devices, accessible through network 240, that are sources of information that may be used by analytics platform 220. For example, server device 230 may include a server that includes particular information for use by analytics platform 220 and/or user device 210. For example, server device 230 may include a server or a group of servers (e.g., a cloud-based server, an application device, a content server, a host server, a web server, a database server, etc.), a desktop computer, or a similar device.

Network 240 includes one or more wired and/or wireless networks. For example, network 240 may include a cellular network (e.g., a fifth generation (5G) network, a long-term evolution (LTE) network, a code division multiple access (CDMA) network, a third generation (3G) network, and/or another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
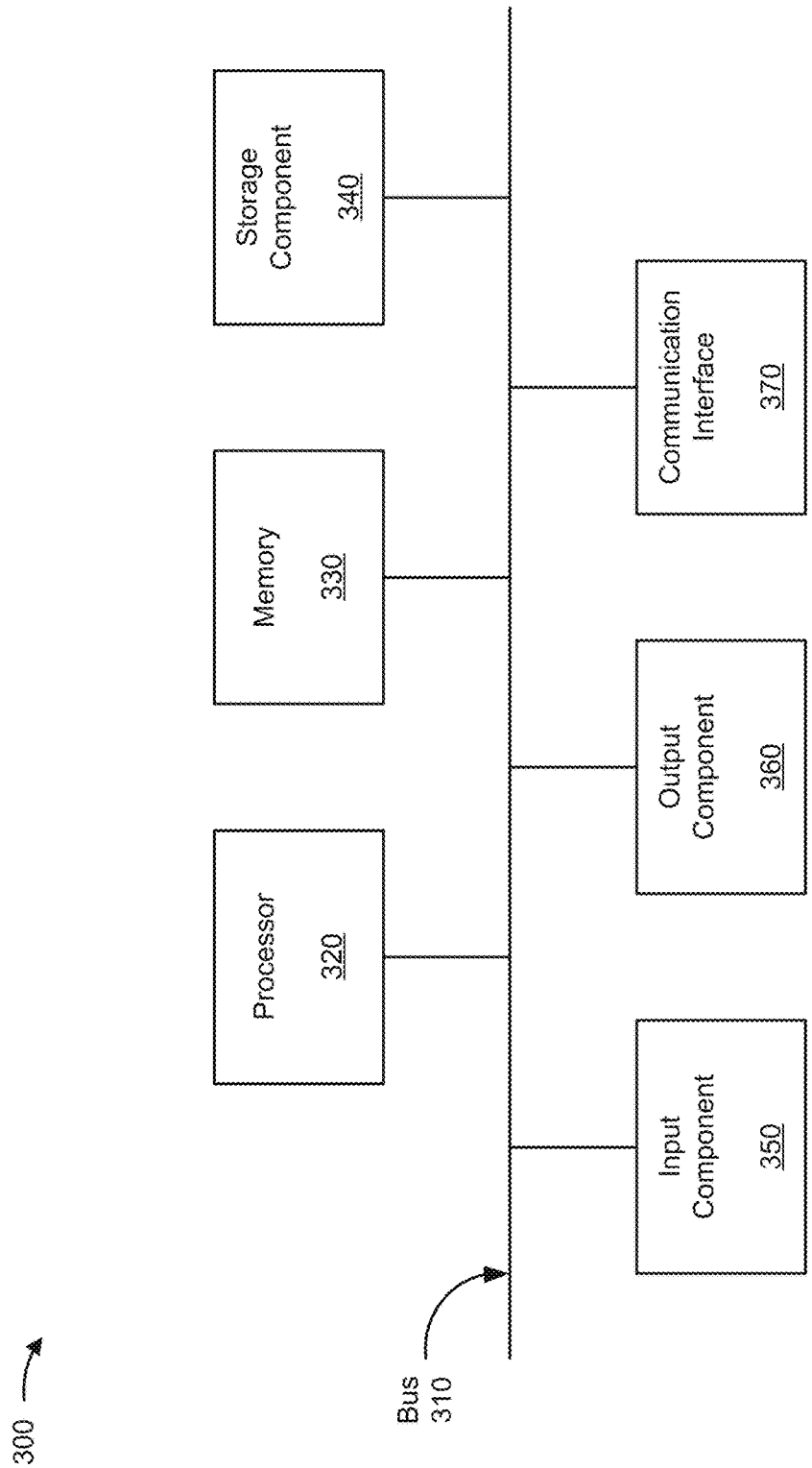
FIG. 3 is a diagram of example components of one or more devices of FIG. 2.

FIG. 3 is a diagram of example components of a device 300. Device 300 may correspond to user device 210, analytics platform 220 and/or server device 230. In some implementations, user device 210, analytics platform 220 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
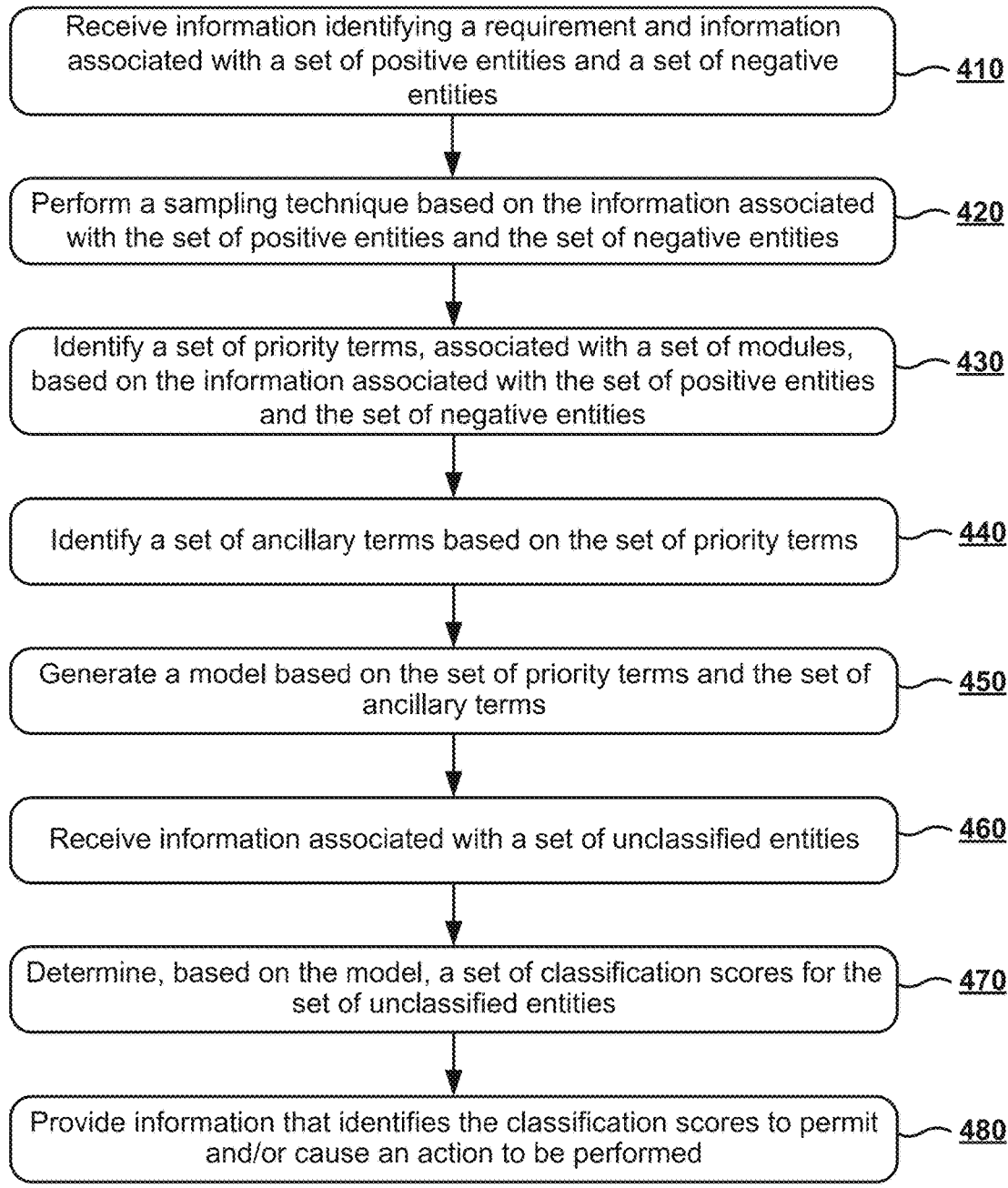
FIG. 4 is a flow chart of an example process for implementing machine learning techniques to perform entity classification.

FIG. 4 is a flow chart of an example process 400 for implementing machine learning techniques to perform entity classification. In some implementations, one or more process blocks of FIG. 4 may be performed by analytics platform 220. In some implementations, one or more process blocks of FIG. 4 may be performed by another device or a group of devices separate from or including analytics platform 220, such as user device 210 and/or server device 230.

As shown in FIG. 4, process 400 may include receiving information identifying a requirement and information associated with a set of positive entities and a set of negative entities (block 410). For example, analytics platform 220 may receive, from user device 210 and/or server device 230, information identifying a requirement and information associated with a set of positive entities and a set of negative entities.

In some implementations, a requirement may be associated with one or more parameters and may identify values that correspond to the one or more parameters (e.g., required values, suggested values, desired values, prohibited values, or the like). For example, the requirement may include a job description, a work order, a proposal, a bid, a grant, an application, or the like. As a particular example, assume that the requirement is associated with a job description. In this case, the job description may include particular parameters and corresponding values (e.g., a desired amount of work experience, a requisite degree and/or concentration, a suggested skill set, etc.). In some implementations, an administrator may select an entity based on a requirement and characteristics associated with the entity (e.g., hire the entity, approve the entity, etc.). As used herein, an administrator, an entity, and/or an operator may refer to an individual, a group of individuals, an organization, a business, an institution, or the like.

In some implementations, analytics platform 220 may receive, from user device 210 (e.g., which may have received an input from an operator), information that identifies a requirement. Additionally, or alternatively, analytics platform 220 may receive, from server device 230, information that identifies the requirement. In some implementations, analytics platform 220 may analyze the requirement to identify parameters and/or values associated with the requirement. Additionally, or alternatively, analytics platform 220 may identify other requirements based on analyzing the requirement, as described below.

In some implementations, analytics platform 220 may receive, from user device 210 and/or server device 230, information associated with other requirements that are related to the requirement. For example, analytics platform 220 may receive information associated with other requirements that include similar parameters and/or values that correspond to the parameters as compared to the requirement. As a particular example, and in the case of the requirement being a job description, analytics platform 220 may receive information associated with other jobs that are related to an occupation, skill set, job role, administrator, etc., associated with the job description.

In some implementations, analytics platform 220 may receive, from user device 210 and/or server device 230, information associated with a set of positive entities and a set of negative entities. As used herein, a positive entity may refer to an entity that satisfies a requirement. Additionally, as used herein, a negative entity may refer to an entity that does not satisfy a requirement. Further still, as used herein, information associated with an entity (e.g., a positive entity, a negative entity, or the like) may be referred to as entity information. In some implementations, entity information may include a resume, a curriculum vitae, an application, a profile, a document, a resource, or the like. Further still, as used herein, an entity information data point may refer to a data point (e.g., a particular resume), and an entity information data set may refer to a set of data points (e.g., a set of resumes).

In some implementations, the entity information may be associated with the other requirements. For example, in situations where the other requirements are other job openings, analytics platform 220 may receive information associated with entities that applied to the job openings. Continuing with the example, the set of positive entities may refer to entities that satisfied the other requirements (e.g., were hired for the other job opening(s), were interviewed for the other job opening(s), were qualified for the other job opening(s), etc.). Further still, the set of negative entities may refer to entities that did not satisfy the other requirements (e.g., were not hired for the other job opening(s), were not interviewed for the other job opening(s), did not qualify for the other job opening(s), etc.). In this way, and as described elsewhere herein, analytics platform 220 improves accuracy of entity scoring and/or selection based on extracting latent information from entity information (e.g., associated with positive entities and/or negative entities) and generating models based on the extracted information.

As further shown in FIG. 4, process 400 may include performing a sampling technique based on the information associated with the set of positive entities and the set of negative entities (block 420). For example, analytics platform 220 may perform a sampling technique based on the entity information. In some implementations, analytics platform 220 may perform a sampling technique, such as a stratified sampling technique, a simple random sampling technique, a systematic sampling technique, a probability proportional to size sampling technique, a cluster sampling technique, a multistage sampling technique, a quota sampling technique, a minimax sampling technique, an accidental sampling technique, a line-intercept sampling technique, a theoretical sampling technique, or the like.

In some implementations, analytics platform 220 may perform the sampling technique to reduce statistical bias associated with the information associated with the set of positive entities and the set of negative entities. In some implementations, analytics platform 220 may receive entity information associated with a set of other requirements (e.g., an entity information data set). Additionally, each requirement, of the set of other requirements, may be associated with a different number of entity data points. Additionally, each requirement may be associated with a different number of positive entities and negative entities. Further still, particular entities, associated with a particular requirement, may be associated with different characteristics (e.g., skill set, work experience, degree, etc.).

In this case, analytics platform 220 may perform a sampling technique such that statistical bias is reduced. For example, analytics platform 220 may perform the sampling technique such that each requirement, of the set of other requirements, is associated with a more similar number of entity data points than as compared to if the sampling technique is not performed. Additionally, or alternatively, analytics platform 220 may perform the sampling technique such that each requirement is associated with a more similar number of positive entities and/or negative entities than as compared to if the sampling technique is not performed. Additionally, or alternatively, analytics platform 220 may perform the sampling technique such that characteristics associated with the entity information are more similar between each requirement of the other requirements than as compared to if the sampling technique is not performed.

In this way, analytics platform 220 improves the accuracy of entity scoring and/or selection based on normalizing the information associated with the positive entities and the negative entities such that bias is reduced.

As further shown in FIG. 4, process 400 may include identifying a set of priority terms, associated with a set of modules, based on the information associated with the set of positive entities and the set of negative entities (block 430). For example, analytics platform 220 may identify a set of priority terms, associated with a set of modules, based on the information associated with the set of positive entities and the set of negative entities.

In some implementations, and as described elsewhere herein, a priority term may include a term that includes a higher occurrence in entity information associated with positive entities than as compared to entity information associated with negative entities. In some implementations, a module may refer to a portion of an entity information data point. For example, an entity information data point may include a set of modules that correspond to particular information. As a particular example, and in a situation where the entity information data point is a resume, a module associated with "education" may include information identifying a school, a time frame associated with school attendance, an obtained degree, a concentration associated with an obtained degree, or the like.

By identifying priority terms on a module basis, analytics platform 220 improves accuracy of model generation for entity scoring and/or selection than as compared to if analytics platform 220 does not identify priority terms on a module basis. For example, a particular term may be of particular importance when used in association with a first module than as compared to a situation where the term is used in association with a second module, and/or a term may include different meanings dependent on the particular module(s) in which the term appears.

In some implementations, analytics platform 220 may obtain text and prepare the text for processing to identify priority terms associated with the set of modules. For example, analytics platform 220 may represent the entity information as text. In some implementations, analytics platform 220 may determine text sections to be processed. For example, analytics platform 220 may determine a manner in which the text is to be partitioned into text sections, and partition the text into text sections. A text section may include, for example, a sentence, a line, a paragraph, a bullet point item, a table, a table entry, a page, a document, or the like. In some implementations, analytics platform 220 may process each text section separately (e.g., serially or in parallel). By partitioning the text into text sections, analytics platform 220 may not have to process each text section of the text, thereby conserving processor and/or memory resources.

In some implementations, analytics platform 220 may prepare the text for processing (e.g., one or more text sections). For example, analytics platform 220 may standardize the text to prepare the text for processing. As an example, the text may be associated with different file types and/or different file formats, and/or may include particular discrepancies relating to other text. In this way, analytics platform 220 may standardize the text, such that the text may be represented in a particular format, thereby conserving processor and/or memory resources by enabling more efficient processing.

In some implementations, analytics platform 220 may prepare the text for processing by performing a natural language processing (NLP) technique, performing optical character recognition (OCR), adjusting characters in the text, such as by removing characters, replacing characters, adding characters, adjusting a font, adjusting formatting, adjusting spacing, removing white space, or the like. For example, analytics platform 220 may remove particular characters (e.g., non-alphanumeric characters, or the like), may replace multiple spaces with a single space, may insert a space (e.g., after a left parenthesis, a left brace, a left bracket, etc., or before a right parenthesis, a right brace, a right bracket, etc.), or the like. In this way, analytics platform 220 may use a space delimiter to more easily parse the text, thereby improving accuracy of the use of the text and/or thereby conserving processor and/or memory resources.

In some implementations, analytics platform 220 may further prepare the text for processing by expanding acronyms in the text, determining words in the text (e.g., by determining characters identified by one or more delimiting characters), associating part-of-speech tags (POS tags) with words in the text, or the like. In this way, analytics platform 220 may improve the accuracy of the use of the text, thereby conserving processor and/or memory resources.

In some implementations, analytics platform 220 may identify terms included in the text, and generate a corpus of terms by generating a data structure that stores terms extracted from the text. In some implementations, a term may refer to a set of characters, such as a single character, multiple characters (e.g., a character string), a combination of characters that form multiple words (e.g., a multi-word term, such as a phrase, a sentence, or a paragraph), a combination of characters that form an acronym, a combination of characters that form an abbreviation of a word, a combination of characters that form a misspelled word, or the like. By generating the data structure that stores terms extracted from the text, analytics platform 220 may process the text more efficiently than if the text was processed without first generating the data structure, thereby conserving processor and/or memory resources.

In some implementations, analytics platform 220 may associate a set of terms and a module based on an identified pattern in the text. For example, analytics platform 220 may identify a particular term, or set of terms, associated with a module based on an identified pattern. Additionally, analytics platform 220 may associate the set of terms and the module based on the identified pattern. For example, analytics platform 220 may identify a particular text section (or text sections) that is associated with an identified pattern, and may associate the text section with the module. In some implementations, analytics platform 220 may generate a set of corpuses of terms that correspond to a set of modules.

In some implementations, analytics platform 220 may determine an occurrence value of a term associated with a module. For example, analytics platform 220 may, for each term in the corpus of terms that corresponds to the module, determine an occurrence value across an entity information data set. That is, analytics platform 220 may identify an occurrence value for a term based on a number of entity information data points that include the particular term in association with a particular module. As a particular example, assume that analytics platform 220 is processing one thousand entity information data points (e.g., resumes). Additionally, assume that analytics platform 220 identifies that three hundred entity information data points include the term "embedded" in association with a particular module (e.g., an experience module). In this case, analytics platform 220 may determine an occurrence value of thirty percent for the particular term "embedded" in association with the particular module.

In some implementations, analytics platform 220 may determine a difference in occurrence values, such as a difference between a first occurrence value of a term in association with entity information data points associated with the set of positive entities, and a second occurrence value of the term in association with entity information data points associated with the set of negative entities. For example, assume that the term "embedded" includes a first occurrence value of thirty percent in association with entity information data points associated with the set of positive entities, and that the term includes a second occurrence value of ten percent in association with entity information data points associated with the set of negative entities. In this case, analytics platform 220 may determine a difference in occurrence values of twenty percent for the term (e.g., 30%–10%=20%).

In some implementations, analytics platform 220 may determine the set of priority terms based on respective differences in occurrence values for the terms between entity information associated with the set of positive entities and entity information associated with the set of negative entities. For example, analytics platform 220 may identify a set of terms that include differences in occurrence values that satisfy a threshold. Additionally, or alternatively, analytics platform 220 may identify terms that include the greatest differences in occurrence values (e.g., the top five terms, the top ten terms, etc.).

In this way, analytics platform 220 may identify particular terms that include the greatest discrepancies in occurrence values between entity information associated with positive entities and entity information associated with negative entities (e.g., thereby indicating that the terms may be of particular importance in view of the requirement), thereby enabling models to be generated based on the priority terms as described elsewhere herein.

As further shown in FIG. 4, process 400 may include identifying a set of ancillary terms based on the set of priority terms (block 440). For example, analytics platform 220 may identify a set of ancillary terms based on the set of priority terms. In some implementations, an ancillary term may refer to a term that occurs within a threshold distance of a priority term for a particular module. For example, an entity information data point may include a priority term, and the entity information data point may include a set of ancillary terms that precede and/or follow the priority term. As an example, assume that the entity information data point includes the phrase "extensive experience designing and testing autonomous vehicles." Additionally, assume that the term "autonomous" is a priority term. In this case, the terms "designing," "testing," and/or "vehicles" may be ancillary terms.

In some implementations, analytics platform 220 may identify a set of ancillary terms for the set of positive entities, and a set of ancillary terms for the set of negative entities. For example, analytics platform 220 may identify entity information data points associated with the set of positive entities that include a priority term, and identify a set of terms that are within a threshold distance of the respective priority terms (e.g., the preceding three terms, the preceding term, the following term, the following four terms, or the like). Additionally, or alternatively, analytics platform 220 may identify entity information data points associated with the set of negative entities that include the priority term, and identify a set of terms that are within a threshold distance of the respective priority terms.

In other words, entity information data points associated with positive entities and entity information data points associated with negative entities may both include a particular priority term. However, the respective information data points may include different ancillary terms that are associated with the priority term. In this way, implementations described herein enable analytics platform 220 to generate models that are more accurate than as compared to models that are generated based solely on priority terms.

As further shown in FIG. 4, process 400 may include generating a model based on the set of priority terms and the set of ancillary terms (block 450). For example, analytics platform 220 may generate a model based on the set of priority terms and the set of ancillary terms. In some implementations, analytics platform 220 may use machine learning techniques to analyze data (e.g., training data, such as historical data, data associated with positive entities, data associated with negative entities, etc.) and create models. The machine learning techniques may include, for example, supervised and/or unsupervised techniques, such as artificial networks, Bayesian statistics, learning automata, Hidden Markov Modeling, linear classifiers, quadratic classifiers, decision trees, association rule learning, or the like.

In some implementations, analytics platform 220 may use another kind of computer-implemented technique, such as artificial intelligence, machine perception, or computer vision, to analyze data and generate models. In some implementations, analytics platform 220 may receive information that identifies a set of positive entities and a set of negative entities (e.g., entities having a known classification, such as positive or negative) and entity information associated with the set of entities (e.g., resumes, curriculum vitaes, profiles, priority terms, ancillary terms, etc.). Additionally, analytics platform 220 may generate a model based on the known classifications and the known entity information.

In some implementations, analytics platform 220 may generate a set of models. For example, analytics platform 220 may generate a set of models based on various training data. In some implementations, analytics platform 220 may generate a model based on particular characteristics associated with the positive entities and/or negative entities. For example, analytics platform 220 may identify a subset of entity information that includes the particular characteristic(s) and train a model using the subset of entity information. As an example, an operator may desire to classify entities, as described below, based on particular characteristics associated with the entities. In this way, analytics platform 220 may generate a set of models that correspond to particular characteristics (e.g., were trained using training data that corresponds to the particular characteristics).

Additionally, or alternatively, analytics platform 220 may identify a subset of entity information that is associated with a particular segment, and train the model using the subset of entity information. For example, a requirement may be associated with a set of segments. As a particular example, a job description may be associated with a set of constituent skill sets that correspond to a set of segments. In this case, analytics platform 220 may generate a set of models that correspond to the set of segments. As an example, a programming job may be associated with a set of programming languages (e.g., HyperText Markup Language (HTML), Python, Java, etc.). In this case, analytics platform 220 may generate a set of models that correspond to particular languages (e.g., were trained using data that corresponds to entities having experience with the particular languages). In this way, analytics platform 220 may generate more particularized models based on various training data. In other words, a model that is generated based on resumes submitted for all programming jobs may be more general than a model that is generated based on resumes submitted for a particular type of programming job (e.g., a Python developer job).

In some implementations, analytics platform 220 may receive, based on classifying entities, additional information that identifies known classifications of the entities, and may update the model based on the additional information. In this way, analytics platform 220 may improve the accuracy of the models based on receiving additional training information.

As further shown in FIG. 4, process 400 may include receiving information associated with a set of unclassified entities (block 460). For example, analytics platform 220 may receive information associated with a set of unclassified entities. In some implementations, the unclassified entities may include entities other than the entities (e.g., positive entities and negative entities) for which entity information was used in creating the set of models. In some implementations, the information associated with the set of classified entities may be associated with a requirement. For example, the requirement may include a job description associated with a job opening. In this case, the unclassified entities may be candidates for the job opening (e.g., candidates that submitted resumes).

In some implementations, analytics platform 220 may receive, from user device 210 (e.g., which may have received an input from an operator) or a data repository, the information that is associated with the set of unclassified entities. For example, the operator may desire to identify classification scores for the set of unclassified entities to assist in a hiring process, or the like.

As further shown in FIG. 4, process 400 may include determining, based on the model, a set of classification scores for the set of unclassified entities (block 470). For example, analytics platform 220 may determine, based on the model, a set of classification scores for the set of unclassified entities. In some implementations, user device 210 (e.g., which may have received an input from an operator) may provide, to analytics platform 220, the information that is associated with the set of unclassified entities, which may cause analytics platform 220 to determine the set of classification scores for the set of unclassified entities. Additionally, or alternatively, user device 210 may provide information that identifies a location at which the information associated with the set of unclassified entities may be retrieved (e.g., a network address, a resource identifier, or the like), and analytics platform 220 may retrieve the information.

In some implementations, a classification score may be indicative of an entity being associated with a particular classification, such as positive, negative, or the like. For example, an entity that is associated with a classification score that satisfies a threshold may be associated with a particular classification, whereas another entity that is associated with a classification score that does not satisfy the threshold may not be associated with the classification (or may be associated with another classification). As a particular example, an entity associated with a higher classification score may be more likely to be hired, selected for an interview, selected to receive a grant, or the like, than as compared to another entity associated with a lower classification score.

In some implementations, analytics platform 220 may determine a set of parameters to be input to a model that may be used to determine a classification score. In some implementations, a parameter may correspond to a priority term. For example, entity information that includes the priority term may be associated with a first parameter value (e.g., that identifies the existence of the priority term), whereas entity information that does not include the priority term may be associated with a second parameter value (e.g., that identifies the non-existence of the priority term).

Additionally, or alternatively, a parameter may correspond to a priority term and an ancillary term (or a set of ancillary terms). For example, entity information that includes the priority term and the ancillary term may be associated with a first parameter value, whereas entity information that does not include the priority term and the ancillary term may be associated with a second parameter value. Additionally, or alternatively, a parameter may correspond to a priority term and an ancillary term associated with positive entities (e.g., an ancillary term included in the entity information associated with the set of positive entities). That is, entity information that includes the priority term and the ancillary term within a threshold distance of the priority term may be associated with a particular parameter value.

Additionally, or alternatively, a parameter may correspond to a characteristic associated with the entity information. For example, entity information that includes the particular characteristic may be associated with a first parameter value, whereas entity information that does not include the characteristic (or includes another characteristic) may be associated with a second parameter value. As an example, a characteristic may be identified by a term or a set of terms. Entity information that includes the term or the set of terms may be associated with a particular parameter value.

In some implementations, analytics platform 220 may determine the classification score based on inputting the set of parameters into the model. In some implementations, analytics platform 220 may determine a set of classification scores, for an unclassified entity, based on different models (e.g., trained using data associated with entities corresponding to particular segments associated with a requirement, associated with entities including particular characteristics, or the like). Additionally, or alternatively, analytics platform 220 may classify an unclassified entity based on the greatest classification score, based on a threshold number of classification scores satisfying a threshold, based on applying weight values to the classification scores, or the like.

In this way, analytics platform 220 enables classification scores to be determined based on models that were trained using entity information associated with entities having known classifications (e.g., positive or negative). In this way, analytics platform 220 more accurately determines a classification score for an unclassified entity based on using models that were trained using latent information associated with entities having known classifications.

As further shown in FIG. 4, process 400 may include providing information that identifies the scores to permit and/or cause an action to be performed (block 480). For example, analytics platform 220 may provide information that identifies the scores to permit and/or cause an action to be performed.

In some implementations, the action may include automatically generating a communication (email, text, etc.), such as an invitation to a job candidate to participate in a screening call; automatically scheduling a meeting (e.g., via an electronic calendar), such as an interview; automatically advancing a process related to an entity, such as identifying a job candidate as a potential hire; automatically processing an entity (e.g., onboarding a new hire); or the like. Additionally, or alternatively, the action may include automatically causing an account to be modified, a record to be modified, a background check to be performed, or the like.

Additionally, or alternatively, the action may include providing, to user device 210, information that identifies the classification scores. For example, user device 210 may provide, for display, information that identifies the entities that are associated with the classification scores. As an example, user device 210 may provide, for display, information that identifies the top ten, the top five, the top three, etc. entities based on respective classification scores. In this way, an operator may quickly identify particular entities. Additionally, in this way, implementations described herein reduce an amount of computing resources that are consumed in order to identify particular entities. As an example, assume that a large number of entities (e.g., ten thousand, twenty thousand, etc.) submit entity information in association with a requirement. In some cases, an operator may interact with user device 210 to analyze entity information for these entities. Implementations described herein reduce such a need.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein enable an analytics platform to receive information associated with a requirement and identify a set of other requirements that are similar to the requirement. Additionally, implementations described herein enable the analytics platform to receive information associated with the other requirements, such as information associated with a set of positive entities and a set of negative entities (e.g., candidates that were hired for other job openings, and candidates that were not hired for the other job openings). Further still, implementations described herein enable the analytics platform to identify information associated with the set of positive entities and the set of negative entities, and generate models based on the information. Thereby, the analytics platform may score unclassified entities, using the generated models, in association with other requirements. In this way, implementations described herein improve accuracy of entity scoring based on extracting latent information from entity information and generating models using training data associated with entities having known classifications (e.g., positive or negative).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive information that identifies a requirement;
receive information associated with a set of positive entities and a set of negative entities,
the set of positive entities and the set of negative entities being associated with other requirements that are associated with the requirement;
identify a set of priority terms based on the information associated with the set of positive entities and the set of negative entities;
identify a set of terms of a phrase that occur within a threshold distance of a priority term of the set of priority terms,
wherein the set of terms is located at the threshold distance by one of:
preceding a quantity of terms, or
subsequent to a quantity of terms;
identify a first set of ancillary terms and a second set of ancillary terms based on the set of terms that occur within the threshold distance of the priority term,
the first set of ancillary terms being associated with the information that is associated with the set of positive entities, and
the second set of ancillary terms being associated with the information that is associated with the set of negative entities;
generate a model based on the set of priority terms, the first set of ancillary terms, and the second set of ancillary terms,
the model being generated based on a machine learning technique,
the machine learning technique being implemented to perform entity classification;
determine a set of classification scores, for a set of unclassified entities, based on information associated with the set of unclassified entities and the model; and
provide information that identifies the set of classification scores to cause an action to be performed in association with the set of unclassified entities.

2. The device of claim 1, where the one or more processors are further to:
determine a first occurrence value for a first term based on the information associated with the set of positive entities;

determine a second occurrence value for the first term based on the information associated with the set of negative entities;
determine a difference between the first occurrence value and the second occurrence value; and
where the one or more processors, when identifying the set of priority terms, are to:
identify the set of priority terms based on the difference.

3. The device of claim 1, where the one or more processors are further to:
identify a set of modules associated with the information that is associated with the set of positive entities and the set of negative entities; and
where the one or more processors, when identifying the set of priority terms, are to:
identify the set of priority terms based on the set of modules.

4. The device of claim 1, where the one or more processors are further to:
identify a set of segments associated with the requirement; and
where the one or more processors, when generating the model, are to:
generate the model based on a segment of the set of segments.

5. The device of claim 1, where the one or more processors are further to:
determine a set of parameters based on the information associated with the set of unclassified entities; and
where the one or more processors, when determining the set of classification scores, are to:
determine the set of classification scores based on the set of parameters.

6. The device of claim 1, where the one or more processors are further to:
perform a sampling technique based on the information associated with the set of positive entities and the set of negative entities; and
where the one or more processors, when identifying the set of priority terms, are to:
identify the set of priority terms after performing the sampling technique.

7. The device of claim 1, where the set of positive entities and the set of negative entities correspond to applicants for a job posting.

8. The device of claim 7, wherein the phrase associated with the requirement includes terms that appear in resumes of the applicants.

9. A method, comprising:
receiving, by a device, information associated with a set of positive entities and a set of negative entities,
the set of positive entities and the set of negative entities being associated with a set of requirements;
identifying, by the device, a set of priority terms based on the information associated with the set of positive entities and the set of negative entities;
identifying, by the device, a set of terms of a phrase that occur within a threshold distance of a priority term of the set of priority terms,
wherein the set of terms is located at the threshold distance by one of:
preceding a quantity of terms, or
subsequent to a quantity of terms;
identifying, by the device, a first set of ancillary terms and a second set of ancillary terms based on the set of terms that occur within the threshold distance of the priority term,
the first set of ancillary terms being associated with the information that is associated with the set of positive entities, and
the second set of ancillary terms being associated with the information that is associated with the set of negative entities;
generating, by the device, a model based on the set of priority terms, the first set of ancillary terms, and the second set of ancillary terms,
the model being generated based on a machine learning technique,
the machine learning technique being implemented to perform entity classification;
determining, by the device, a set of classification scores, for a set of unclassified entities, based on information associated with the set of unclassified entities and the model; and
providing, by the device, information that identifies the set of classification scores to cause an action to be performed in association with the set of unclassified entities.

10. The method of claim 9, further comprising:
determining a set of first occurrence values, for the set of terms, based on the information that is associated with the set of positive entities;
determining a set of second occurrence values, for the set of terms, based on the information that is associated with the set of negative entities; and
where identifying the set of priority terms comprises:
identifying the set of priority terms based on the set of first occurrence values and the set of second occurrence values.

11. The method of claim 9, further comprising:
identifying a set of characteristics associated with the set of unclassified entities; and
where determining the set of classification scores comprises:
determining the set of classification scores based on the set of characteristics.

12. The method of claim 9, further comprising:
identifying a requirement associated with the set of unclassified entities,
the requirement being associated with the set of requirements; and
where determining the set of classification scores comprises:
determining the set of classification scores based on the requirement.

13. The method of claim 9, further comprising:
performing a sampling technique based on the information associated with the set of positive entities and the set of negative entities; and
where identifying the set of priority terms comprises:
identifying the set of priority terms after performing the sampling technique.

14. The method of claim 9, further comprising:
identifying a set of modules associated with the set of requirements; and
where identifying the set of priority terms comprises:
identifying the set of priority terms based on the set of modules.

15. A non-transitory computer-readable medium storing instructions, the instructions comprising:

one or more instructions that, when executed by one or more processors, cause the one or more processors to:
receive information that identifies a requirement;
receive information associated with a set of positive entities and a set of negative entities,
the set of positive entities and the set of negative entities being associated with other requirements that are associated with the requirement;
identify a set of priority terms based on the information associated with the set of positive entities and the set of negative entities;
identify a set of terms of a phrase that occur within a threshold distance of a priority term of the set of priority terms,
wherein the set of terms is located at the threshold distance by one of:
preceding a quantity of terms, or
subsequent to a quantity of terms;
identify a first set of ancillary terms and a second set of ancillary terms based on the set of terms that occur within the threshold distance of the priority term,
the first set of ancillary terms being associated with the information that is associated with the set of positive entities, and
the second set of ancillary terms being associated with the information that is associated with the set of negative entities;
generate a model based on the set of priority terms, the first set of ancillary terms, and the second set of ancillary terms,
the model being generated based on a machine learning technique,
the machine learning technique being implemented to perform entity classification;
determine a set of classification scores, for a set of unclassified entities, based on information associated with the set of unclassified entities and the model; and
provide information that identifies the set of classification scores to permit an action to be performed in association with the set of unclassified entities.

16. The non-transitory computer-readable medium of claim 15, where the one or more instructions, when executed by the one or more processors, further cause the one or more processors to:
identify a first subset, of the set of priority terms, that is associated with a first module of the information associated with the set of unclassified entities;
identify a second subset, of the set of priority terms, that is associated with a second module of the information associated with the set of unclassified entities; and
where the one or more instructions, that cause the one or more processors to identify the set of priority terms, cause the one or more processors to:
identify the set of priority terms based on the first subset and the second subset.

17. The non-transitory computer-readable medium of claim 15, where the one or more instructions, when executed by the one or more processors, further cause the one or more processors to:
identify a first subset of entities, of the set of unclassified entities, that are associated with classification scores that satisfy a threshold; and
where the one or more instructions, that cause the one or more processors to provide the information that identifies the set of classification scores, cause the one or more processors to:
provide information that identifies the first subset of entities.

18. The non-transitory computer-readable medium of claim 15, where the one or more instructions, when executed by the one or more processors, further cause the one or more processors to:
perform a sampling technique based on the information associated with the set of positive entities and the set of negative entities; and
where the one or more instructions, that cause the one or more processors to identify the set of priority terms, cause the one or more processors to:
identify the set of priority terms based on the information associated with the set of positive entities and the set of negative entities and after performing the sampling technique.

19. The non-transitory computer-readable medium of claim 15, where the set of positive entities and the set of negative entities correspond to applicants for a job posting.

20. The non-transitory computer-readable medium of claim 15, where the one or more instructions, when executed by the one or more processors, further cause the one or more processors to:
identify a set of characteristics associated with the set of positive entities and the set of negative entities;
generate a set of models based on the set of characteristics,
the set of models including the model; and
where the one or more instructions, that cause the one or more processors to determine the set of classification scores, cause the one or more processors to:
determine the set of classification scores based on the set of models.

* * * * *